DOUGHERTY & GERECKE.
Ice-Cream Freezer.
No. 66,685.   Patented July 16, 1867.
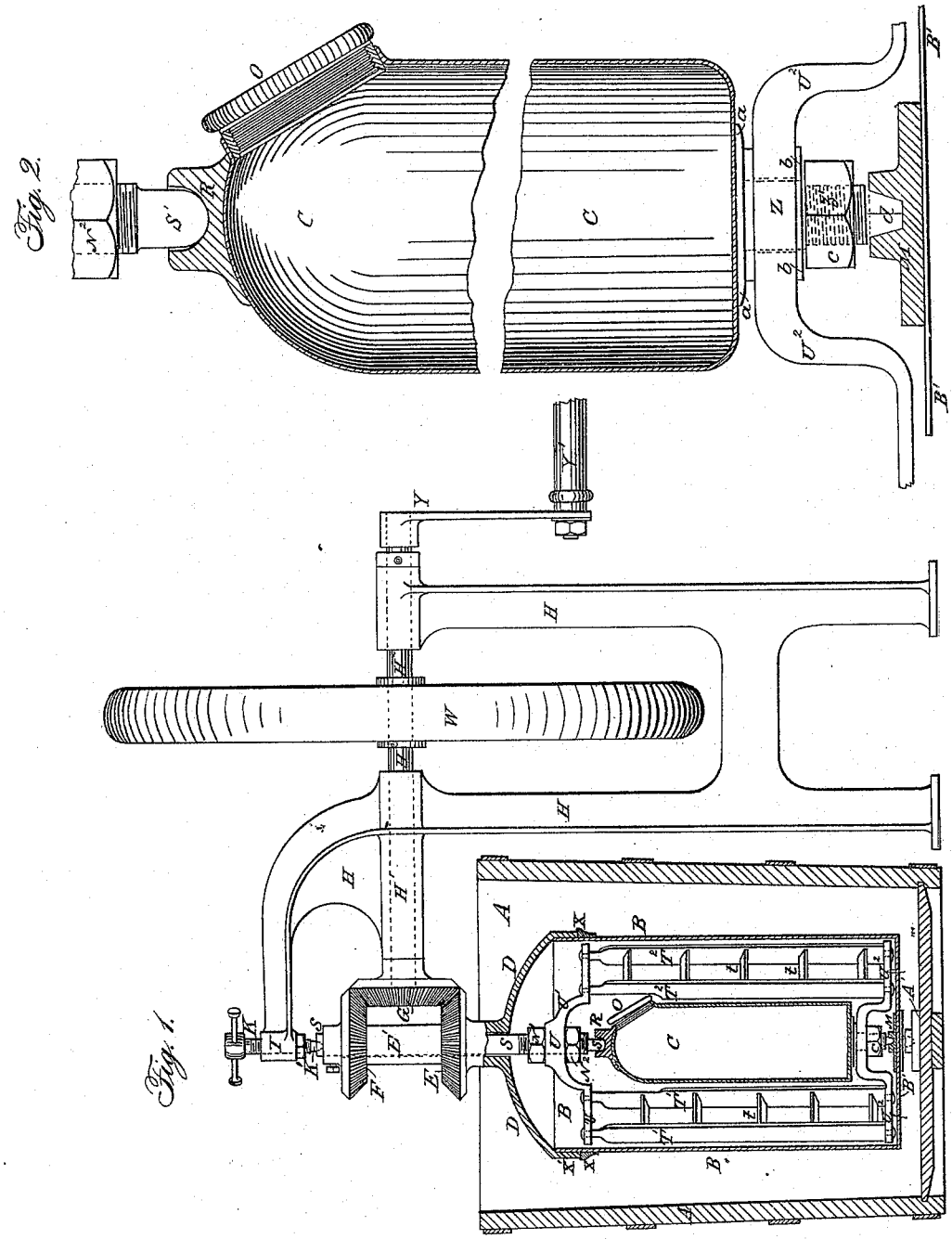
Witnesses:
Inventor:

United States Patent Office.

JOSHUA W. DOUGHERTY AND F. W. GERECKE, OF NEWBURG, NEW YORK.

*Letters Patent No. 66,685, dated July 16, 1867.*

ICE-CREAM FREEZER.

*The Schedule referred to in these Letters Patent and making part of the same.*

TO ALL WHOM IT MAY CONCERN:

Be it known that we, JOSHUA W. DOUGHERTY and F. W. GERECKE, of Newburg, in the county of Orange, and State of New York, have invented a new and useful Improvement on Ice-Cream Freezers; and we do hereby declare that the following is a full, clear, and exact description thereof, reference being had to the accompanying drawing, and to the letters of reference marked thereon.

The nature of our invention consists in using a centre freezer in connection and combination with the beaters, which are used for stirring the cream and scraping it off from the walls of the vessel when it is exposed to the effect of the cold mixture of ice and salt for making ice-cream. This centre freezer is a hollow cylindrical vessel, made of tin, copper, or any other suitable material, to receive a quantity of ice and salt, or any other cooling mixture, for the purpose of freezing the cream from the centre, although when being exposed to the effect of a cooling mixture from outside. This centre freezer, being put in the centre body of the cream, removes this centre part of the cream, which is always badly stirred by the rotating motion of the beaters, and freezes the cream in less time than if it is only cooled from outside. In the accompanying drawing—

Figure 1 represents a side view and a vertical section of an ice-cream machine.

Figure 2, a section of the centre freezer in larger scale.

A A are a wooden tub, for the reception of the cold mixture of ice and salt. On the inside bottom is fastened in the centre a step, A', for the end of a centre-pin on the bottom of the ice-cream vessel B B to keep the vessel B in its place when being turned. B B are the cylindrical vessel for the reception of the cream when fully prepared for freezing. D' D' are a cast-iron cover closing the top of vessel B, and fitting, with a slot cut in its side, over a hub, $x'$, on the vessel B, so that when a turning motion is given to the cover D', it will turn the vessel B also. This turning motion is given to it by a set of bevel-wheels. One of them, E, is cast on the cover or fastened to a long sleeve on the cover. The second wheel, G, is the driving-wheel; the third one, F, is fastened to a shaft, S, going through the sleeve of the cover, and to which are fastened the beaters of the machine. A wooden or cast-iron frame, H H, with shaft $H^2$, wheel W, crank Y, and handle Y', are used to complete a machine for turning the driving-wheel G by hand or by other power. The shaft S, to which are fastened the beater-arms, is cut off a short distance below the upper arm $U^1$, and a centre-pin, S', turned on its end. The arm $U^1$ is fastened to the shaft by a screw on the shaft, and held in its place by two jam-nuts $N^1$ and $N^2$. The lower arm $U^2$, is not fastened to the shaft S, but is free, having a hole in its centre through which passes a pin, Z, fig. 2, loose, and around which pin Z the arm is allowed to revolve. A washer, $b\ b$, and a nut, $c$, support it from below. The upper arm $U^1$ and the lower arm $U^2$ are firmly connected by vertical rods or beaters $T^1\ T^1\ T^2\ T^2$, which are again connected by small horizontal beaters $t\ t\ t$. A cylindrical vessel, C, has in its centre on top a step, R, to receive the pin S' of the shaft S, and on its bottom a pin, Z Z' $d$, fastened by a plate, $a\ a$. The lower end $d$ is square, and fits in a square step, M, on the inside bottom of the main cream vessel B. This end $d$ is made square on account of making this cylinder C revolve with the vessel B when set in motion by the wheel E, and the cylinder C is kept in its place by those two points S' on top and $d$ on bottom. By the third wheel F a motion in an opposite direction is given to the shaft S and to the beaters $T^1\ T^2$, and in this way a most effective cooling surface is given to the cream. The whole apparatus is held firm in its position while being turned by a centre set-screw, K, going through a hub, T, connected with a frame, H H, and a step, A', in the inside bottom of the wooden tub A A. The cylinder C has an opening or a man-hole, O, of a suitable size, as near to the top as possible, to be shut tight by a screw, O, for the use of putting the cold mixture of ice and salt in the cylinder, and for removing the water when the whole beating apparatus is taken out for putting a new quantity of cream in the vessel B for freezing. The cylinder C can be filled and emptied without being taken out of connection with the beater.

In small ice-cream machines, where the outside vessel B is only stationary in a tub filled with ice, and the beaters revolved by hand, the bottom step M is to be square, and the pin $d$ on the cylinder C square also, to leave the centre freezer stationary, so that the cream freezing on the sides of the cylinder C can be scraped off by the revolving vertical beaters $T^1\ T^2$.

What we claim as our invention, and desire to secure by Letters Patent, is—

The cylindrical centre freezer C, with the man-hole O, upper centre step R', centre-pin $d$, on bottom, in combination with the beater-arms $U^1\ U^2$, and the outer cream-vessel B B by the square step M, substantially and for the purpose as specified.

J. W. DOUGHERTY,
F. W. GERECKE.

Witnesses:
JNO. C. NOE,
JOHN B. KERR.